(12) United States Patent
Sargent et al.

(10) Patent No.: US 6,424,891 B1
(45) Date of Patent: Jul. 23, 2002

(54) AIRCRAFT GROUND POWER UNIT

(75) Inventors: Paul E. Sargent; Timothy C. Hurley; Michael J. Iselo, all of Rome, NY (US); Anthony N. Brown, Adams, TN (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 09/538,527

(22) Filed: Mar. 30, 2000

Related U.S. Application Data (60) Provisional application No. 60/128,426, filed on Mar. 31, 1999.

(51) Int. Cl.$^7$ ............................................. G01M 17/00
(52) U.S. Cl. ........................................................ 701/29
(58) Field of Search ................................ 701/3, 29, 35; 280/838, 839, 837

(56) References Cited

U.S. PATENT DOCUMENTS

| | | | | |
|---|---|---|---|---|
| 4,101,100 A | * | 7/1978 | Smith et al. ............ 244/114 R |
| 5,253,891 A | * | 10/1993 | Carlin et al. ................. 280/422 |
| 5,894,393 A | * | 4/1999 | Elliott et al. .................... 361/42 |
| 5,993,163 A | * | 11/1999 | Iden ............................. 417/43 |
| 6,068,216 A | * | 5/2000 | Prins ....................... 244/134 R |
| 6,320,773 B1 | * | 11/2001 | Urish et al. .................... 363/92 |

* cited by examiner

*Primary Examiner*—Richard M. Camby
(74) *Attorney, Agent, or Firm*—Harold L. Burstyn; Joseph A. Mancini (57) ABSTRACT

An Aircraft Ground Power Unit ("AGPU") is a mobile vehicle, preferably self-propelled, on which is mounted an enclosure. Within the enclosure are a number of subsystems, each of which provides a service required by a stationary aircraft for servicing and diagnostic testing prior to flight. Such services include electrical power, hydraulic power, engine-start capability (bleed-air), conditioned air (hot or cold) for the aircraft's equipment recesses or interior, and nitrogen to inflate struts and operate power tools. The control, status, configuration, and automation of all of the subsystems contained within the enclosure are consolidated under computer control. The enclosure and the subsystems contained therein can be readily mounted on and dismounted from the vehicle.

17 Claims, 5 Drawing Sheets

AIRCRAFT GROUND POWER UNIT

This application is a continuation of Provisional Application Serial No. 60/128,426 filed Mar. 31, 1999.

STATEMENT OF GOVERNMENT INTEREST

The invention described herein may be manufactured and used by or for the Government for governmental purposes without the payment of any royalty thereon.

BACKGROUND OF THE INVENTION

1. Technical field

This invention relates to the field of aircraft ground servicing, specifically, to the provision of electrical, fluidic, and gaseous inputs to fixed and rotary wing aircraft at the airfield and on the flightline. An aircraft on the ground whose engine is not functioning requires a number of services to determine whether the aircraft is in a condition to fly or taxi. These services include: electrical power, hydraulic power, engine-start capability (bleed-air), air conditioning or heating of the aircraft's interior, and nitrogen to inflate struts and operate power tools.

2. Background Art

Aircraft Ground Power Units (AGPUs) have been in existence for nearly as long as piston- and turbine-powered aircraft. The shrinking of the defense budget, combined with the increasing projection of U.S. military power throughout the world, requires the armed forces to do more with less equipment and fewer personnel. Thus labor-intensive tasks are increasingly burdensome to today's leaner military. Thus there is concern that employing older flightline equipment, such as the prior art AGPUs, is incompatible with present-day military manpower and logistics.

The prior art has substantial limitations. Currently, a separate AGPU is required for each requirement (hydraulics, conditioned air, nitrogen, electricity, air start, etc.). Each AGPU must be towed into place adjacent the aircraft to be serviced. Towing each separate AGPU takes time, tying up equipment, the tow vehicle itself, and the people required to operate both the power unit and the tow vehicle. Wartime conditions make servicing each aircraft more difficult.

No currently available AGPU provides all the outputs necessary to service a wide variety of aircraft. Thus each flightline must maintain a multiplicity of separate AGPUs for each aircraft type. Further because no currently available AGPU is self-powered, each must be manually connected to a tow vehicle and brought adjacent to the aircraft to be serviced. For example, the U.S. Army currently uses an AGPU (NSN 1730-01-144-1897, produced by Engineered Systems, Inc.; see Army Technical Manual TN 55-1730-229-12 or Air Force Technical Order TO 35C2-3-473-1) that is very heavy, hard to move (because it is not self-propelled), and that does not provide the voltages and frequencies required by all aircraft the Any employs.

A prior attempt to sol the logistics problems associated with multiple, towed, AGPUs is disclosed in U.S. Pat. No. 4,101,100 to Smith et al. Smith et al. discloses a system of servicing islands that furnish compressed air, electricity, and conditioned air from a common source. While Smith et al. discloses how to supply a plurality of servicing inputs to an aircraft, the aircraft itself must be towed to the island.

Thus Smith et al. fails to solve the problem addressed by the present invention for at least three reasons. First, a tow vehicle is still required to bring the aircraft to the service island. If multiple aircraft must be moved into position simultaneously for servicing, as Smith et al. suggests, then multiple tow vehicles are required. Thus Smith et al. teaches away from the present invention, which eliminates multiple towing. Second, not all aircraft can be towed. Rotary-wing aircraft (e.g., helicopters) may not have wheels and therefore cannot be towed. It is therefore not clear how helicopters could utilize the island disclosed by Smith et al. In contrast, the present invention teaches how to service all aircraft (both fixed and rotary-wing) by bringing a unitary servicing apparatus to the aircraft. Third, the present invention discloses means for aircraft servicing in forward-deployed areas of the world, encompassing makeshift airfields over unimproved terrain. Smith et al requires installation into an airfield, even if the installation be temporary rather than permanent. The present invention, on the other hand, requires no installation. It is inherently portable and thus best addresses rapid deployment to remote, unimproved regions.

Prior-art AGPUs also require manual configuration and monitoring each time they are employed to service an aircraft. That is, each AGPU must be manually set up each time it services an aircraft—even if the same type of aircraft is being serviced repetitively.

OBJECTS AND SUMMARY OF THE INVENTION

It is therefore an object of the present invention to provide an apparatus that overcomes the deficiencies of the prior art in ground servicing of aircraft.

It is a further object of the present invention to provide a single, self-powered unit that combines all the components necessary to service a variety of aircraft without requiring power from the aircraft itself.

It is another object of this invention to automate the process of aircraft servicing.

It is a still further object of this invention to control through a computer the components necessary to service an aircraft.

It is yet a further object of this invention to provide computer programs that recognize different aircraft and automatically configure all of the components necessary to service a particular aircraft.

It is still another object of this invention to provide a mountable and demountable air cycle machine for producing conditioned air for servicing an aircraft.

It is yet still a further object of this invention to provide a valve to divert bleed air from a subsystem power unit to either an air cycle machine, a buddy start system, or a deicing system.

An additional object of the present invention is to provide at least one access point on an AGPU from which to make all connections to the aircraft to be serviced.

A further additional object of the present invention is to achieve operation over varying terrain to permit forward deployment in remote areas.

The present invention achieves these and other objects through a single, self-powered, self-moving vehicle on which is detachably mounted a self-contained, self-powered,, and computer-controlled service unit that supplies all inputs required to service an aircraft. The present invention eliminates separate tow vehicles and co-locates all of the aircraft servicing outputs in a single unit.

The present invention reduces the number of servicing units required on the flightline. For example, to start the Comanche helicopter requires 30–35 kw of 270 volt DC power, about 40 lbs./minute of cooling air, about 12 gals./ minute hydraulic power at 3,000 psi,, and about 40 lbs./ minute bleed-air. So, to service the Comanche, one or more AGPUs must have mounted on them units that provide each of these services. The Apache Longbow helicopter, however, requires about 75 kw of 120 volts, 400 Hz AC power and about 100 w of 28 volt DC power. So, to service the Apache, the one or more AGPUs require different generators than to service the Comanche. (Cooling requirements are approximately the same for both aircraft.) Given the plethora of aircraft in the military inventory, the present invention eliminates maintaining a large number of AGPUs, one for each type of aircraft.

A computer inside the enclosed service unit of the present invention monitors the components that service an aircraft through software programs and an operator interface. The type of aircraft is chosen from a menu-driven display. The computer responds to the operator's selections and rapidly configures the AGPU of the present invention to supply the correct servicing outputs in the correct quantities for that particular aircraft. This simple method of configuring contrasts with the prior-art devices that require the operator to manually configure each separate (and separately towed) servicing unit. Configuring the prior-art servicing units can require an operator either to page through extensive operation manuals or to be trained extensively to apply specialized knowledge. At best, the prior-art device depends upon a highly skilled operator; at worst, it may fail for lack of an experienced operator.

Nothing in the prior art teaches or suggests this aspect of the present invention. In the prior art, there is no built-in database for servicing aircraft. The data exist in separate servicing manuals for each type of aircraft and, perhaps, in the operator's memory. Furthermore, once the operator decides upon the parameters of the servicing outputs to supply the aircraft, he must manually configure the unit by rotating knobs, throwing switches, reading dials and gauges to successfully service the aircraft. The present invention reduces the labor required and minimizes the possibility of operator error.

In the preferred embodiment of the present invention, an air cycle machine is mounted atop the enclosure, and its input is coupled, through the enclosure, to the bleed air output of the prime mover. The air cycle machine thus benefits from the self-containment and self-mobility of the AGPU of the present invention. In the prior art, the air cycle machine must be separately towed into position. Alternatively, in the present invention the air cycle machine can be removed and made independent of the AGPU. At the point where the air cycle machine would otherwise directly connect, a duct may be connected to the bleed air exit from the AGPU. This duct can be coupled to an air cycle machine, a deicing system, or a buddy-start system, any of which may be located remotely from the AGPU.

Rough terrain presents a significant obstacle to the towed units of the prior art.

Rotary-wing aircraft (e.g., helicopters) and certain fixed-wing aircraft (e.g., Harrier jets and V-22 Osprey) operate in forward deployment, and they must be serviced by AGPUs. The prior-art units would be wholly ineffective in such environments. This deficiency is overcome by the present invention.

Briefly stated, an AGPU is a mobile vehicle, preferably self-propelled, on which is mounted an enclosure. Within the enclosure are a number of subsystems, each of which provides a service required by a stationary aircraft for servicing and diagnostic testing prior to flight. Such services include electrical power, hydraulic power, engine-start capability (bleed-air), conditioned air (hot or cold) for the aircraft's equipment recesses or interior, and nitrogen to inflate struts and operate power tools. The control, status, configuration, and automation of all of the subsystems contained within the enclosure are consolidated under computer control. The enclosure and the subsystems contained therein can be readily mounted on and dismounted from the vehicle.

According to an embodiment of the invention, apparatus for servicing an aircraft comprises: a self-propelled vehicle; a service unit detachably mounted to the vehicle; the service unit being controllable by a computer; and the service unit being effective for providing a plurality of outputs.

According to a feature of the invention, a method for servicing an aircraft, comprises the steps of: installing at least one program in at least one computer; storing an aircraft servicing database in the at least one computer; configuring a service unit according to the database to service a chosen aircraft; and applying the service unit to service the chosen aircraft as directed by the at least one program.

According to another feature of the invention, apparatus for servicing an aircraft comprises: at least one program installed in at least one computer; an aircraft servicing database stored in the at least one computer; a service unit configured according to the database to service a chosen aircraft in response to instructions in the at least one program; and the service unit being mounted on a self-propelled vehicle.

These and many other objects and advantages of the present invention will be readily apparent to one skilled in the pertinent art from the following detailed description of a preferred embodiment of the invention and the related drawings, in which like reference numerals designate the same elements.

DESCRIPTION OF THE PREFERRED EMBODIMENT

Figure 1:
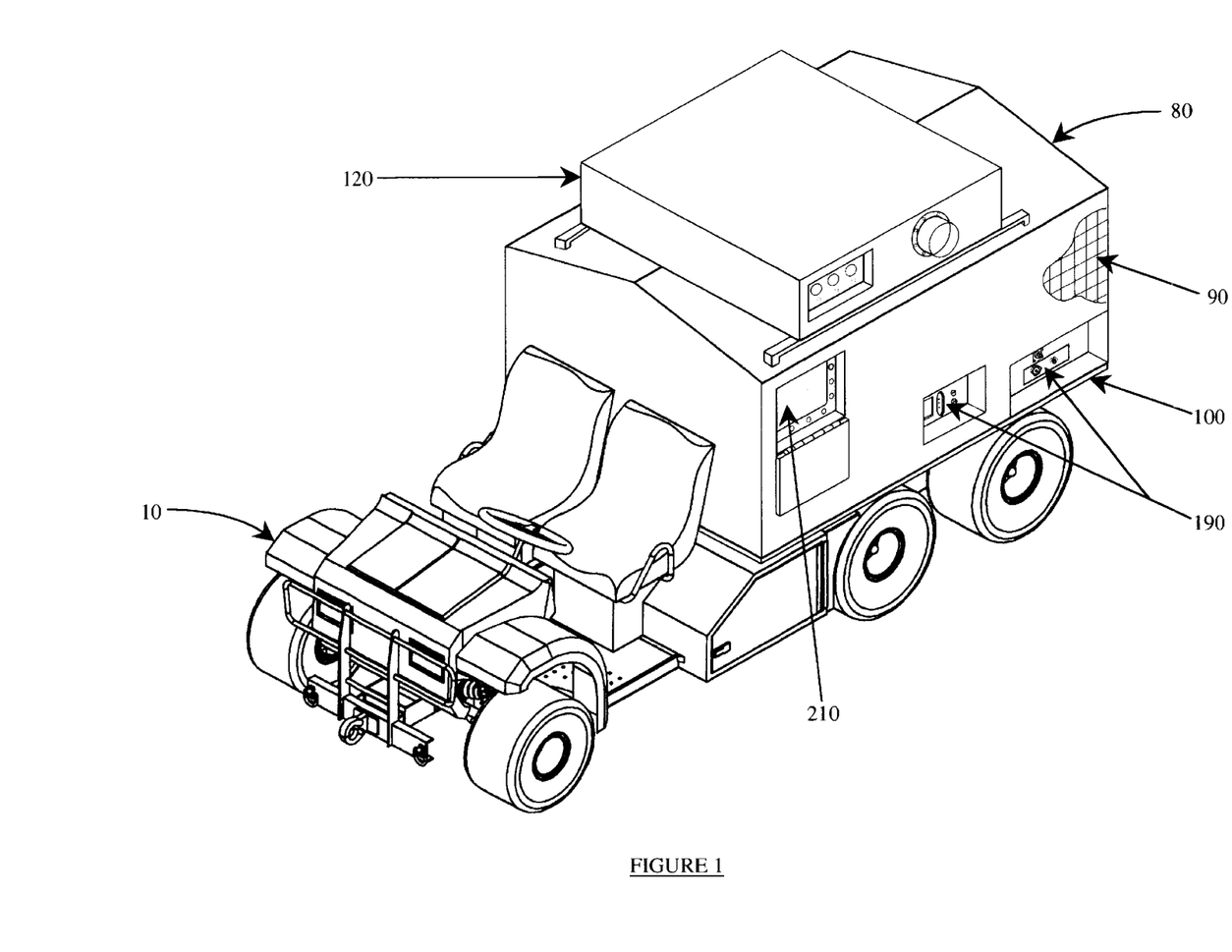
FIG. 1 is a perspective view from the left front of the AGPU of the present invention.

Referring to FIG. 1, a self-propelled vehicle 10 has six wheels. Vehicle 10 is powered by a three-cylinder diesel engine mated to a centrifugal clutch and variable pitch pulley. A chain connected to the pulley drives the rear four wheels. In the preferred embodiment, vehicle 10 is a modified Gator® or M-Gator® manufactured by John Deere. The dump-cart of the Gator® is removed and the wheelbase extended to accommodate a service unit 90. In alternate embodiments, the front wheels of vehicle 10 may also be power-driven.

Vehicle 10 has a diamond-plate bed 100 of a length commensurate with its chassis. An enclosure 80 covers diamond-plate bed 100 and service unit 90 mounted thereon to protect them from the elements. An air cycle machine 120 is mounted to the top of enclosure 80. Enclosure 80 has an operator interface 210 and a hook-up panel 190 recessed into its sidewall.

Figure 2:
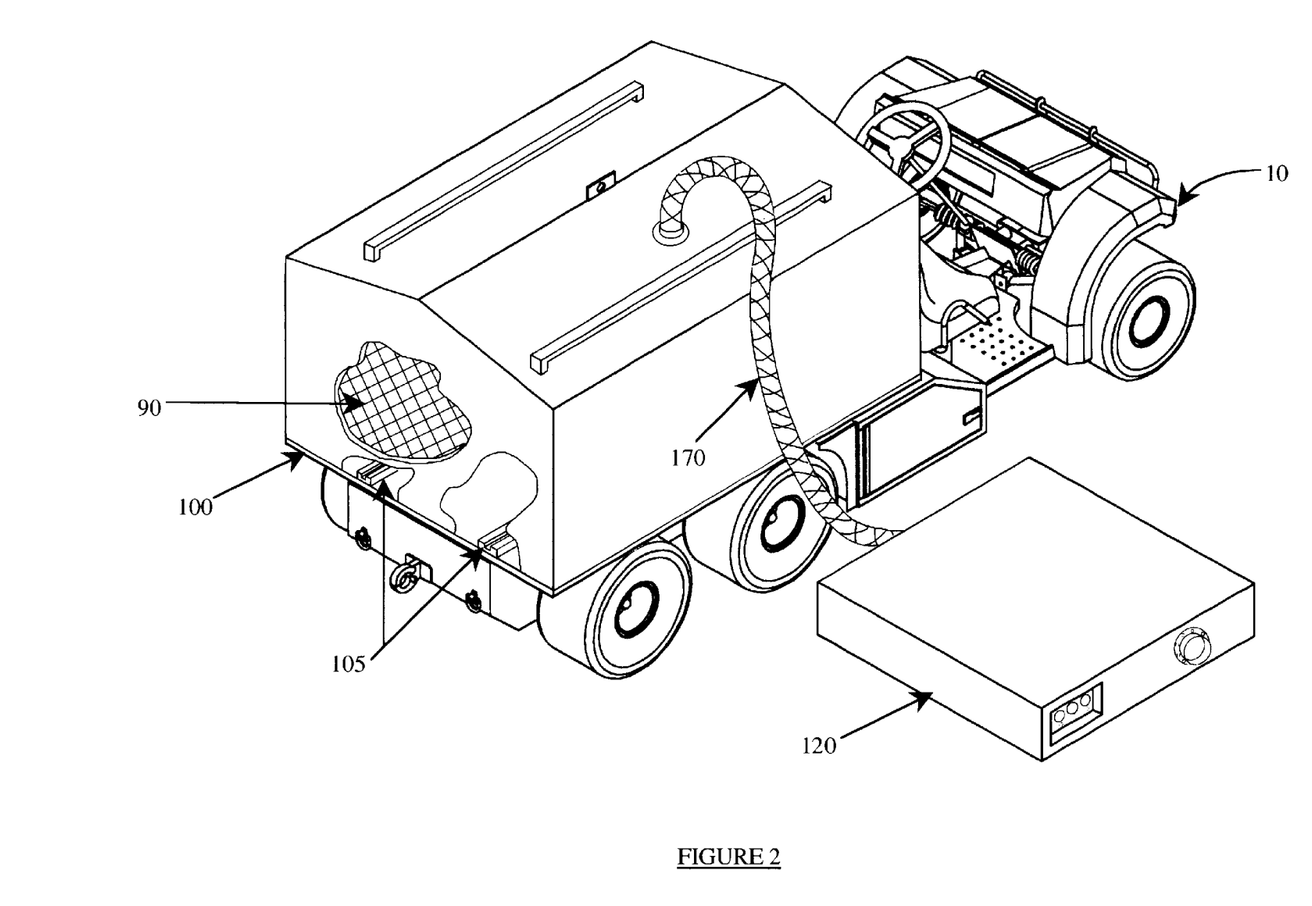
FIG. 2 is a perspective view from the right rear of the AGPU of the present invention.

Referring to FIG. 2, air cycle machine 120 can be detached from vehicle 10, placed on the ground, and connected to service unit 90 by a bleed air duct 170. Diamond-plate bed 100 further incorporates at least two U-shaped channels 105 that accept rollers (not shown) mounted to the base of service unit 90. Channels 105 facilitate the rapid removal and replacement of service unit 90.

Figure 3:
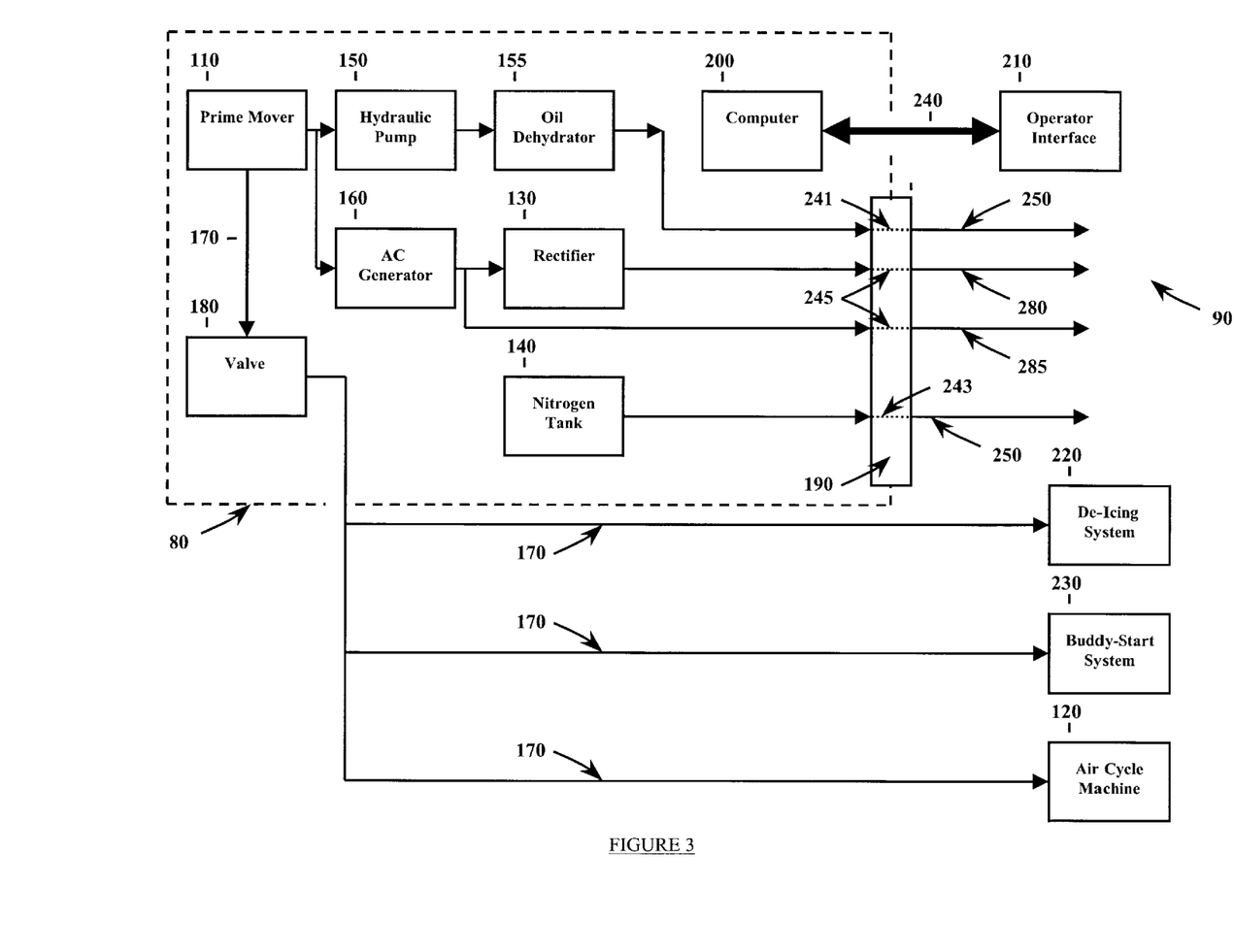
FIG. 3 is a functional block diagram showing the physical interrelation of the subsystems and components of the present invention.

Referring to FIG. 3, service unit 90 has the following components: a prime mover 110, a rectifier 130, a nitrogen tank 140, a hydraulic pump 150, an oil dehydrator 155, an AC generator 160, duct 170, a valve 180, and a computer 200. Service unit 90 further comprises operator interface 210 and hook-up panel 190, which are externally accessible through openings in enclosure 80. Hook-up panel 190 contains electrical connectors 245, a fluid hydraulic coupling 241, and a gaseous nitrogen coupling 243. Air cycle machine 120, a de-icing system 220, and a buddy-start system 230 are not enclosed by enclosure 80. They are located external to service unit 90 and connected to it by duct 170.

Prime mover 110 is a gas turbine that drives hydraulic pump 150 and AC generator 160. In the preferred embodiment, prime mover 110 is an Allied Signal Gas Turbine Engine, model GTCP85-397, that develops 200 shaft horsepower and produces 140 lbs./min bleed air output. Prime mover 110 employs a two-headed gear pad for shaft power take-off. Hydraulic pump 150 and AC generator 160 are mated to the output shaft power take-off of prime mover 110. Hydraulic pump 150 in this embodiment is an Allied Signal Hydraulic Pump rated at 15 gals/min output flow, 7986 clockwise revolutions per minute (rpm), discharge pressure of 500 to 3550 pounds per square inch (psi) at a temperature of 275 degrees F. Oil dehydrator 155, a UtiliDry Oil Dehydration System, model LFDS50DS08P, is placed in the return line to hydraulic pump 150. AC generator 160 is a General Electric Generator with 3-phase output voltages at 120 and 208 volts, a frequency of 380/420 hertz (Hz), a 75000 volt-amps reactive (75 KVA) power rating at 0.8 power factor (PF), and an rpm range of 5700 to 6300 rpm. Rectifier 130 converts the 3-phase, 400 Hz output of AC generator 160 to direct current (DC) of 200 amperes (amps) at 28 volts DC.

In this embodiment, rectifier 130 is manufactured by Pacific Scientific (NSN 6130-01-279-1555). A prototype Dynamic Conversion rectifier 130 can replace it. Given a 3-phase, 120/208 volt, 380 to 420 Hz AC input from AC generator 160, the prototype rectifier 130 supplies 28 volts DC at 200 amps for a 100% duty cycle, 400 amps for 60 seconds, and 1000 amps for 5 seconds. It can additionally provide a 270-volt DC output at 100 amps at a 100% duty cycle, 200 amps for 60 seconds, and 300 for 5 seconds.

Prime mover 110 also produces a bleed-air output from its compressor stage. This bleed-air output flows through duct 170 and into valve 180, a two-position valve. If valve 180 is positioned to enable flow, bleed air will flow through further ducting and upward out of the top of the rigid enclosure 80. If valve 180 is positioned to restrict flow, bleed air will not be drawn off the compressor stage of prime mover 110. In the standard configuration of the preferred embodiment, air cycle machine 120 is mounted atop enclosure 80, and bleed-air duct 170 passes through enclosure 80 directly into air cycle machine 120 mounted above it. Either TEMP or Allied Signal, Inc., manufactures air cycle machine 120. Both provide conditioned air, either hot or chilled, at pressures of 0 to 3000 psi and volumes of 0 to 13 gallons per minute (gal/min). In alternate embodiments, bleed air may be ducted to air cycle machine 120, buddy-start system 230, or de-icing system 220, each of which may be physically separated from service unit 90 and vehicle 10. If valve 180 is positioned to restrict flow, no bleed air will be drawn from prime mover 110, and thus neither air cycle machine 120, buddy-start system 230, nor de-icing system 220 will be powered. In the preferred embodiment, buddy-start system 230 and de-icing system 220 are manufactured by Kaiser Electro Prevision as Lightweight Buddy Start System/H-60 ABSLATS Kit Buddy Start and Deicing Nozzle, part number 70073-3001-011 (NSN 1560-01-277-1590).

Nitrogen tank 140 supplies nitrogen. It may be routed either to hook-up panel 190 with a quick-disconnect coupling or directly to the aircraft being serviced via a length of hose. Hook-up panel 190 receives pressurized hydraulic fluid from hydraulic pump 150 and provides (1) a return connection to hydraulic pump 150; (2) pressurized nitrogen from nitrogen tank 140; (3) alternating current (AC) at 120/208 volts via an electrical cable 285, 400 Hz, from AC generator 160, and (4) direct current (DC) at 28 volts via an electrical cable 280 from rectifier 130. Hook-up panel 190 makes these outputs available to aircraft to be serviced through standard quick-disconnect couplings 241 and 243 and electrical connectors 245. Aircraft are connected to the couplings and connectors by electrical cables 280, 285 and hoses 250 of sufficient length to reach from hook-up panel 190 to the aircraft undergoing service.

Figure 4:
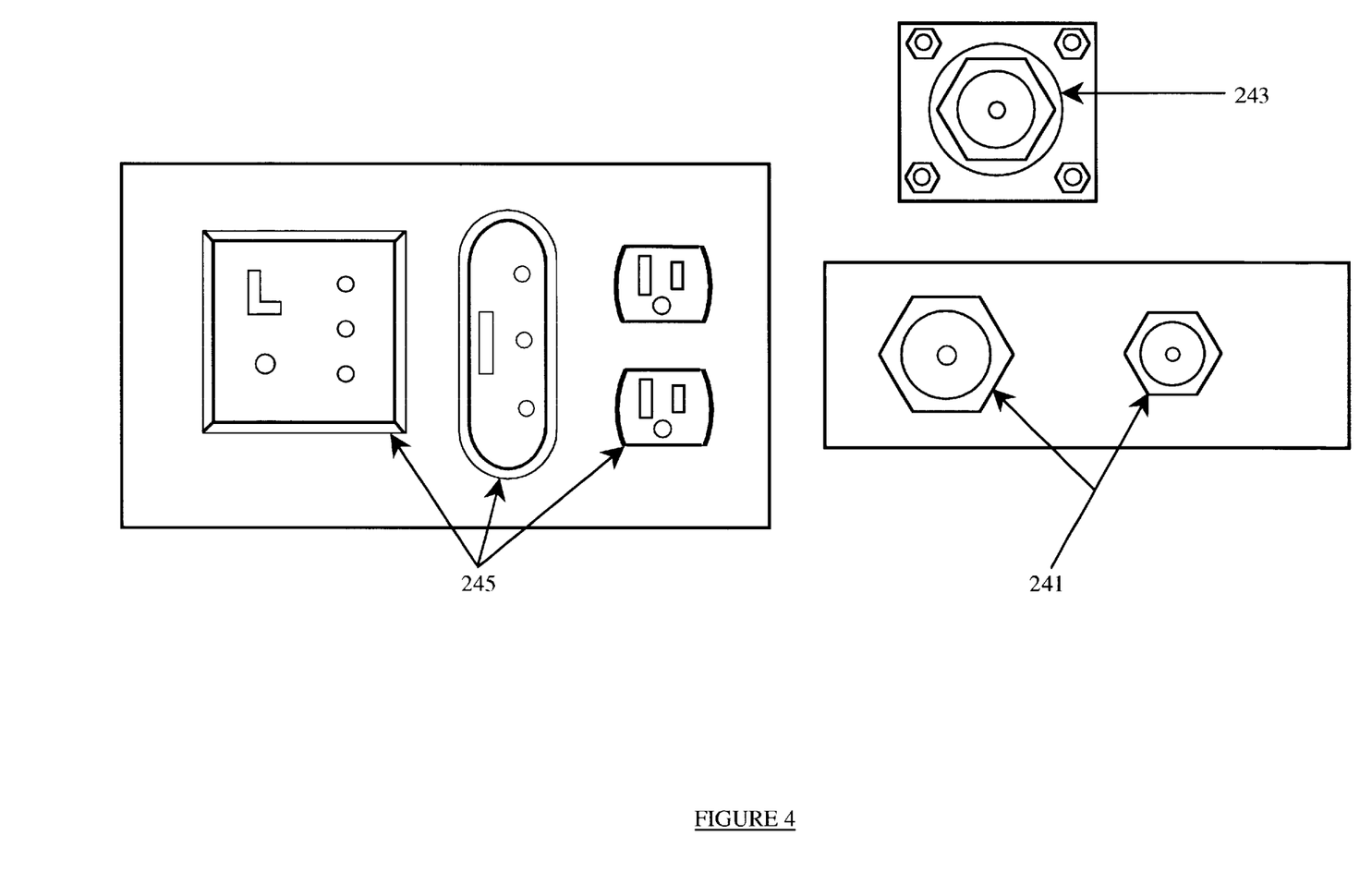
FIG. 4 shows the hookup panel mounted into the side of the enclosure depicted in FIG. 1.

Referring to FIG. 4, hookup panel 190 has quick-disconnect gaseous nitrogen coupling 243, electrical connectors 245 for each of AC and DC current, and fluid hydraulic supply and return coupling pair 241.

Figure 5:
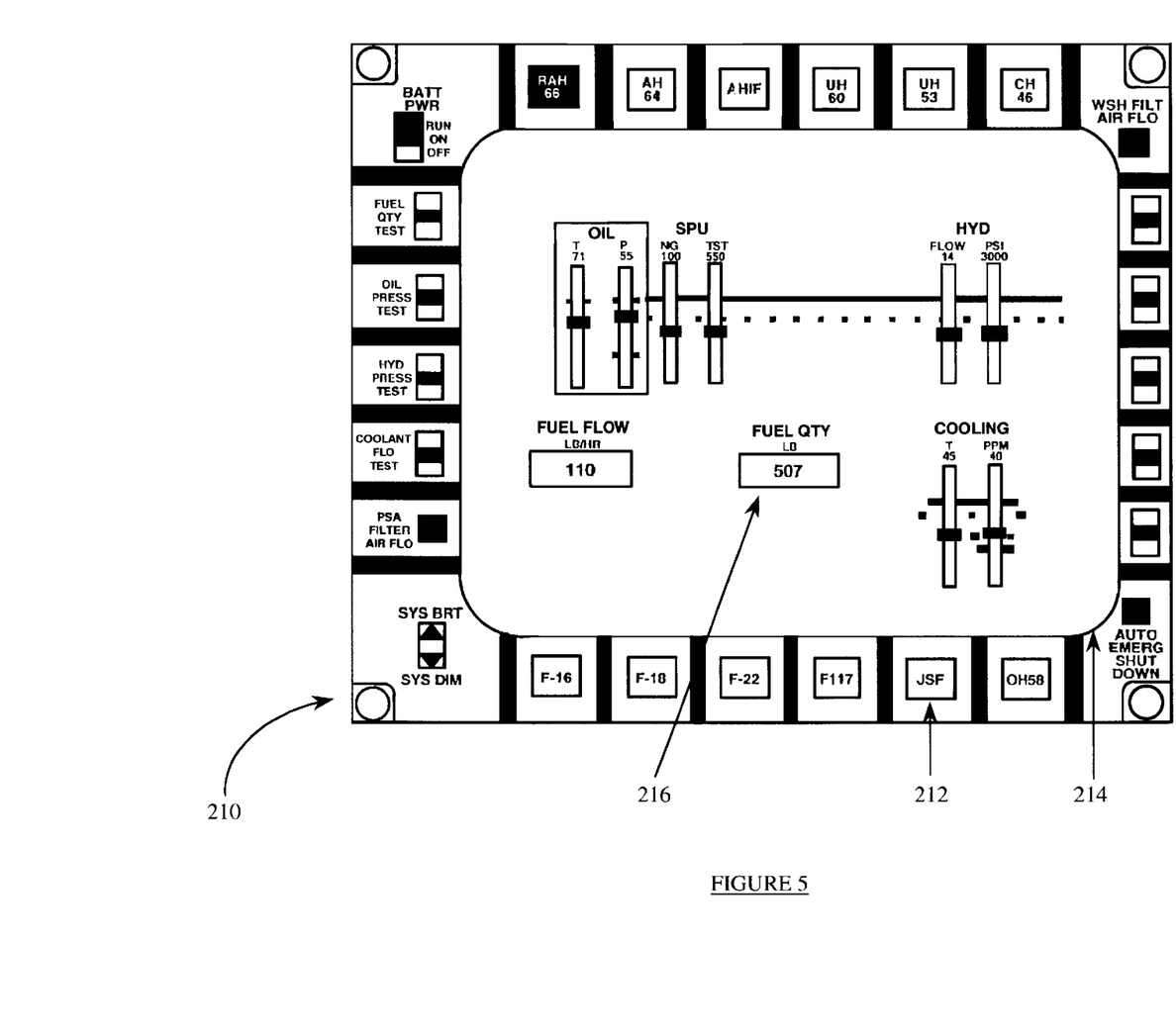
FIG. 5 shows the operator interface panel of the present invention.

Referring to FIG. 5, interface 210 has a set of input keys 212 for instructing computer 200 to run software to correctly configure service unit 90 for the specific aircraft undergoing service. Interface 210, a prototype unit from Tulip Development Laboratory, is connected to computer 200 by a bi-directional data bus 240. Interface 210 lets the operator of the present invention configure service unit 90 with minimum effort for any particular aircraft. A few keystrokes on interface 210 direct computer 200 to initiate the correct software for servicing a specific aircraft. Interface 210 has both function keys 212 and a touch-sensitive display panel 214. Function keys 212 are preprogrammed for a variety of fixed and rotary-wing aircraft. Pressing one of function keys 212 configures service unit 90 for that aircraft automatically.

Touch-sensitive display panel 214 is a super VGA (SVGA) resistive unit, 12.1 inches diagonally, made by Dynapro. A custom-fabricated interface ring sandwich-mounts touch-sensitive display panel 214 to interface 210. Touch-sensitive display panel 214 is sealed against dirt, dust, and indirect splashing. The video connection from touch-sensitive display panel 214, via interface 210, to computer 200 is a standard PC connection such as a monitor cable. Bi-directional data bus 240 connects interface 210 to computer 200 via an RS-232 Dynapro SC-3 controller card. Computer 200 is a CompactPIX model, manufactured by National Instruments, configured with PXI-1000B, 8-slot chassis (part number 777551-01); PXI-8156B, 333 megahertz AMD K6-2 processor running Windows NT, with 32 megabyte SDRAM installed, a four (4)-gigabyte hard drive, two (2) megabytes of SVGA ram, a floppy drive, a USB port, a parallel port, two (2) serial ports, a general purpose interface bus (GPIB), and an ethernet connection port (part number 777884-32). Also installed in computer 200 are an additional 128 megabytes of SDRAM (part number 777885-128), a PXI-6533 digital I/O module and NI-DAQ for Windows NT, and a high-speed 32-line digital I/O module (part number 777429-01), a PXI-6052E multifunction I/O board with 16-bit, SE/8DI inputs (part number 777962-01), and a PXI-6704 high-resolution analog output board for PXI 16-bit, 32 DC analog output (part number 777796-01). Computer 200 is connected to analog-to-digital transducers in service unit 90 to monitor parameters and control functions. A LABVIEW program resides on computer 200 that automatically configures service unit 90 and monitors its parameters. The LABVIEW program supports a graphical user interface (GUI) 216 for interactive display on touch-sensitive screen 214.

While the preferred embodiments of the invention have been particularly described in the specification and illustrated in the drawing, it should be understood that the invention is not so limited. Many modifications, equivalents, and adaptations of the invention will become apparent to those skilled in the art without departing from the spirit and scope of the invention as defined in the appended claims.

What is claimed is:

1. Apparatus for servicing an aircraft, which comprises:
   a self-propelled vehicle;
   a service unit detachably mounted to said vehicle;
      said service unit further comprising a computer,
         said computer comprising a first capability for executing a program stored in a database, said database being particular to a chosen aircraft, and a second capability comprising communicating with, configuring, controlling and monitoring said service unit and said chosen aircraft when servicing said chosen aircraft; and
      said service unit being capable of providing a plurality of outputs,
         said outputs comprising pneumatic, fluidic and electrical aircraft servicing outputs.

2. Apparatus as in claim 1, wherein said service unit further comprises:
   a prime mover that produces a power output and a bleed-air output;
   coupled to said power output:
      a hydraulic pump for producing a fluid hydraulic pressure output; and
      a generator for producing an alternating current;
   a rectifier for converting said alternating current to direct current;
   a source of nitrogen; and
   connecting means to provide at least one of said plurality of outputs to said chosen aircraft.

3. Apparatus as in claim 2, wherein said service unit further comprises:
   at least one first transducer for monitoring said service unit;
   at least one second transducer for monitoring said chosen aircraft;
   said at least one first and second transducers communicating with said computer; and
   an interface to facilitate an operator's interaction with said computer.

4. Apparatus as in claim 2, further comprising:
   detachably mounted to said service unit, an air cycle machine whose input is coupled to said prime mover's bleed-air output.

5. Apparatus as in claim 2, further comprising a valve to regulate said bleed-air output.

6. Apparatus as in claim 1, wherein said service unit is within an enclosure.

7. Apparatus as in claim 2, wherein said connecting means includes a hook-up panel having at least one connector effective for detachably connecting said service unit to said chosen aircraft.

8. Apparatus as in claim 1, wherein said vehicle further comprises:
   a motor;
   traction means for moving said vehicle over improved and unimproved terrain;
   a transmission for supplying power from said motor to said traction means; and
   an internal fuel reservoir.

9. Apparatus for servicing an aircraft, which comprises:
   at least one program installed in at least one computer;
   an aircraft servicing database stored in said at least one computer;
   a service unit configured according to said database to service a chosen aircraft in response to instructions in said at least one program;
      wherein said service unit provides a plurality of pneumatic, fluidic and electrical aircraft servicing outputs, said aircraft servicing outputs further comprising:
      bleed air,
      pressurized hydraulic fluid,
      nitrogen,
      alternating current,
      direct current; and
   said service unit further comprising a means for detachably mounting on a self-propelled vehicle.

10. Apparatus for servicing an aircraft, which comprises:
    at least one computer;
    a first means, interactive with said at least one computer, for configuring
       at least one service unit to service a chosen aircraft,
       said first means further comprising a second means for executing within said at least one computer, a program stored in a database, said database being particular to said chosen aircraft; and
    a third means, interactive with said first means and said second means, for communicating with, controlling and monitoring said service unit and said chosen aircraft when servicing said chosen aircraft.

11. Apparatus as in claim 10, further comprising an operator interface, said operator interface being interactive with said at least one computer, said first, said second and said third means.

12. Apparatus as in claim 11, further comprising a display means interactive with said operator interface.

13. A method for servicing an aircraft, comprising the steps of:
    installing at least one program in at least one computer;
    storing an aircraft servicing database in said at least one computer; configuring a service unit according to said database to service a chosen aircraft; and
    applying said service unit to service said chosen aircraft as directed by said at least one program, wherein said step of applying further comprises the step of:

providing a plurality of pneumatic, fluidic and electrical aircraft servicing outputs to said chosen aircraft.

14. The method of claim 13, wherein said step of applying further includes the step of instructing said computer via an operator interface.

15. The method of claim 13, further including, prior to said step of configuring, detachably mounting said service unit on a self-propelled vehicle.

16. The method of claim 13, wherein said step of configuring further includes the step of instructing said computer via an operator interface.

17. The method of claim 13, wherein said step of applying further includes the step of informing an operator via a display.

* * * * *